Sept. 27, 1966            L. VICINO            3,275,148

ANTI CLOG DEVICE FOR LUBRICATING SYSTEM

Filed Oct. 7, 1963            2 Sheets-Sheet 1

INVENTOR.
Lawrence Vicino

BY
Hansen and Lane

HIS ATTORNEYS

Sept. 27, 1966   L. VICINO   3,275,148
ANTI CLOG DEVICE FOR LUBRICATING SYSTEM
Filed Oct. 7, 1963   2 Sheets-Sheet 2

INVENTOR.
Lawrence Vicino
BY
*Hansen and Lane*
HIS ATTORNEYS

United States Patent Office 3,275,148
Patented Sept. 27, 1966

3,275,148
ANTI CLOG DEVICE FOR LUBRICATING SYSTEM
Lawrence Vicino, 415 5th St., Gilroy, Calif.
Filed Oct. 7, 1963, Ser. No. 314,323
5 Claims. (Cl. 210—168)

This invention relates to the lubricating system of an engine and more particularly to an anti clogging device for the oil inlet screen of the oil circulating system of an internal combustion engine or the like.

In a typical oil lubrication circuit of an oil pressure system for such engines the oil is stored in a sump or pan forming a part of the crank case into which the bearings between the crank shaft and connecting rods are dipped for lubrication. Oil is drawn from the sump via a pipe by a pump and directed under pressure through tubes and passages in and about the engine to various parts thereof requiring lubrication. The inlet end of the pipe going to the pump is confined within a cage like screen submerged in the oil in the sump to keep particles of foreign matter from entering the oil pressure system and lines. After long and continuous use the oil in a crankcase becomes gummy due to being mixed with carbons, acids and residual waxes. Such foreign matter tends to lodge upon and cling to the screen and ultimately clogs the same starving the oil pressure system from an adequate supply of oil.

The present invention contemplates the provision of an anti-clogging device for the inlet screen of the oil pressure system of an internal combustion, spark ignition and on compression ignition type engine or the like.

It is an object of this invention to provide a device for cleaning the inlet screen of an oil pressure system.

It is another object of the present invention to provide a sweep arm within the screen for back flushing the same with oil from the system and means for impelling such sweep arm by oil under pressure from the oil pressure system.

It is another object to provide a brush on the sweep arm for dislodging foreign matter from the inlet screen preliminary to the back flushing of the screen by oil under pressure from the oil pressure relief line of the system.

It is yet another object to provide means for directing oil from within the inlet screen toward the intake line of the oil pressure system to drive the brushing and flushing sweep arm.

It is still another object to provide a rotary spraying and sweeping device for the intake screen in the sump of an oil pressure system. This object further contemplates the provision of means for driving the rotary spraying and sweeping device by circulation of the oil through turbines embodied in the present invention.

It is another object to employ the oil under pressure of a conventional oil pressure system for creating rotary spray from a series of flushing jets and for moving such jets over the inlet screen of such system. It is a further object to employ the vacuum or suction of oil into and through the intake screen for driving the rotary sprayer.

These and other objects of the present invention will become apparent from a reading of the following description and drawings in which.

Figure 7:
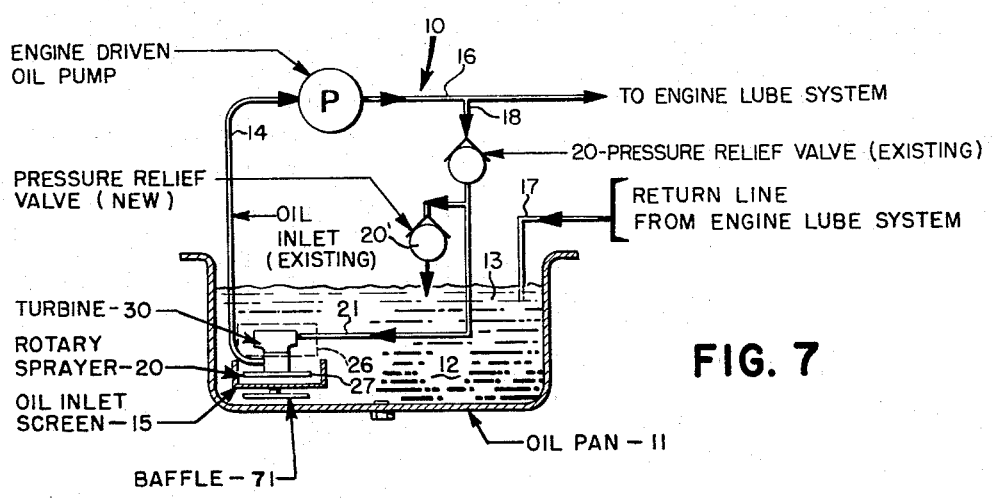
FIG. 7 is a schematic diagram of an oil pressure system embodying the anti-clogging device of the present invention at the inlet screen thereof.

Referring first to FIG. 7 an oil pressure system 10 is shown as including a crankcase pan 11 providing a sump 12 for holding the usual supply of lubricating oil 13, a pump P having an intake conduit 14 extending down into the sump 12 and into a closed screen 15 submerged in the oil 13, and a discharge conduit 16 leading from the pump P through the lubricating passages of an engine (not shown) in conventional manner and returning from the engine to the sump 12 via a return conduit 17. In addition to the foregoing a conventional oil pressure system further includes a pressure relief conduit 18 tapped into the discharge conduit 16 near the pump P and including a pressure relief valve 20 whereby to relieve the pressure side of the system of oil under pressure and for returning such excess oil back into the sump 12 via a discharge conduit 21 thus bypassing the oil passages and lines in the engine.

The present invention is embodied in the screen 15 and is constructed to keep the screen clear and free of any foreign matter which would ordinarily clog the screen.

Figure 1:
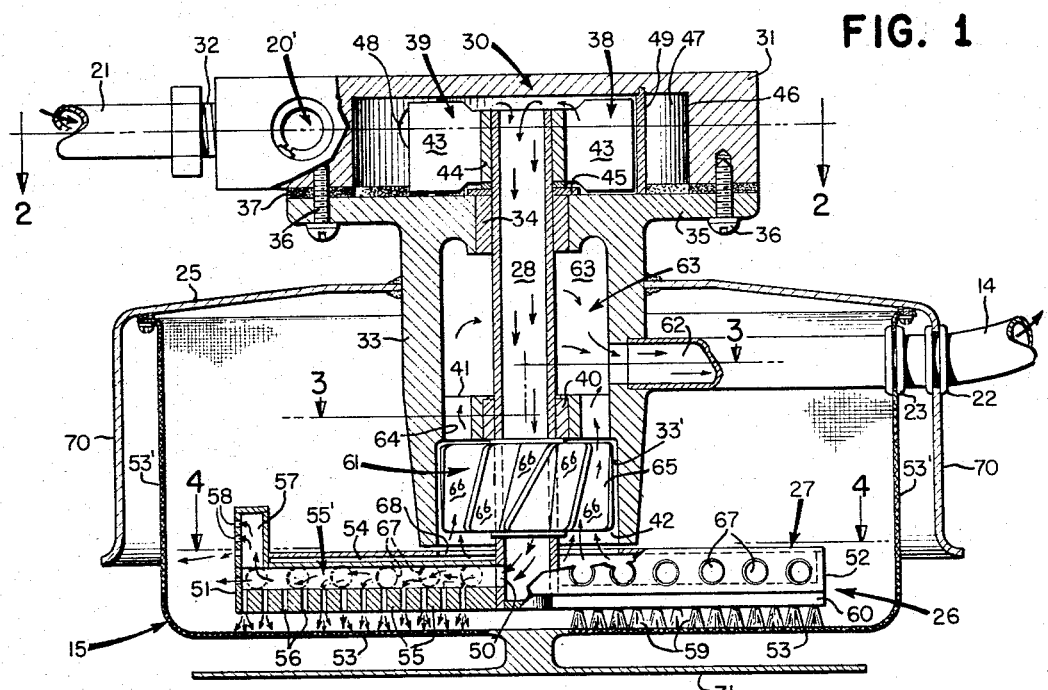
FIG. 1 is a vertical section through the anti-clogging device of the present invention, certain parts being shown in elevation for purposes of illustration.
Figure 3:
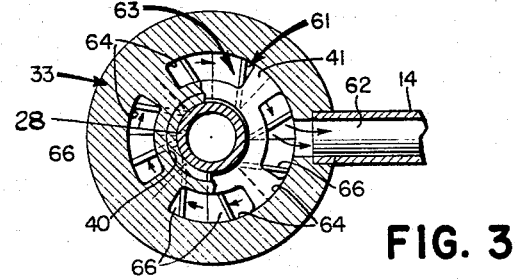
FIG. 3 is a horizontal section of a portion of FIG. 1 as seen from line 3—3 thereof.

Referring to FIG. 1 the screen 15 is a cup shaped member of fine wire mesh having its upper end closed by a cover 25 to confine the inlet end of the intake conduit 14 in a position to strain foreign matter out of the oil 13 before it enters the pump P and the pressure lines of the lubricating system 10. The screen 15 and its cover 25 are supported as a unit by the conduit 14 which enters both the screen and part of the cover through firm fitting grommets 22 and 23 in a manner well known in the art.

In accordance with the present invention the anti-clogging device 26 generally comprises a rotary sprayer and sweep arm 27 arranged within and concentrically of the cup shaped screen 15 on an impeller shaft 28 of a turbine 30 having its housing 31 communicating with the discharge end 32 of the pressure relief discharge conduit 21 of the oil pressure system 10.

More specifically the turbine 30 comprises a cylindrical housing 33 which extends through the cover 25 and is secured thereto concentrically of the latter by solder, welding or the like. The housing 33 has an axial bearing or bushing 34 at its upper end which is surrounded by a flange 35. The housing 31 of the turbine 30 is secured by machine screws 36 to the flanged upper end 35 of the housing 33 and provided with a suitable pressure seal gasket 37. The turbine housing 31 (FIG. 2) has a circular chamber 38 formed therein co-axially of the housing 31.

A turbine wheel or propeller 39 is secured to the upper end of the impeller shaft 28. The shaft 28 is mounted for rotation in the bearing bushing 34 adjacent the wheel 39. The shaft 28 is also journaled in another bearing 40 press fit into an axial bore in a web 41 formed in the cylindrical housing 33 substantially midway between the cover 25 and the open lower end 42 of the housing 33.

The turbine wheel 39 has a plurality of blades 43 extending radially from a hub 44 which is secured to the upper end of the shaft 28. The hub 44 rests upon thrust bearings 45 which in turn rest upon the flat upper surface of the upper bearing bushing 34 and the flat upper face of the cylindrical housing 33. The outer ends of the turbine wheel blades 43 revolve in an orbit short of the internal annular wall 46 of the chamber 38 to leave an annular circulating space 47 for the incoming oil under pressure. The incoming oil enters the chamber 38 via a lateral passage 48 which is tangent to the space 47 and in communication with the discharge end 32 of the pressure relief conduit 21 to receive oil under pressure therefrom. It should here be noted that a secondary pressure relief valve 20' is provided in the housing 31 of the turbine 30 between the end of the conduit 21 and the entrance passage 48 of the turbine 30.

A shield or baffle plate 49 is arranged in the oil entry zone of the chamber 38 and partially circumscribes the turbine wheel 39 at the inner periphery of the annular space 47. By this arrangement the incoming oil under pressure is caused to swirl within the turbine housing 31 before contacting the blades 43 to turn the wheel 39 and the shaft 28.

Figure 2:
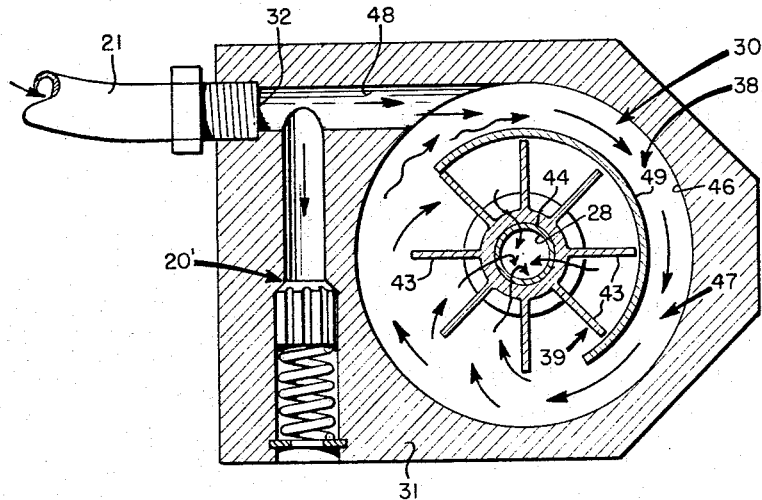
FIG. 2 is a horizontal section through FIG. 1 taken along line 2—2 thereof.

As best seen in FIGS. 1 and 2 the shaft 28 is tubular and open at its upper end, the latter being spaced from the cover shell of the housing 31 to receive oil under pressure from the turbine housing. The lower end of the tubular shaft 28 is closed but open at one side 50 (FIG. 4) to communicate with the hollow interior of one of the two blades 51 of the sweep arm 27. The blades 51 and 52 of the sweep arm 27 are flat tank-like members that extend radially from the lower end of the shaft 28 for turning movement therewith. The sweep arm 27 is disposed in close proximity to the bottom 53 of the cup-like screen 15. The one blade 51 which has communication with the tubular shaft 28 has a partial tubular partition 54 (FIGS. 4 and 5) soldered to its floor 55 to confine the oil in an isolation channel 55' within such blade. The pressurized oil coming from the turbine 30 via the shaft 28 is directed into the channel 55' along the floor and through a plurality of apertures 56 formed in the floor 55 in spaced relation radially along the same. By this arrangement the pressurized oil is discharged through the apertures 56 as a line of jets with such downward force as to spray the bottom 53 of the screen 15 and force any clogging material downwardly and outwardly of the screen.

At the extreme outer end of the one blade 51 the channel 55' communicates with an upstanding tube 57 having a closed upper end and a plurality of apertures 58 formed through its outside wall. The oil under pressure forced through these apertures 58 discharge in jet streams outwardly against the annular side wall 53' of the cup-shaped screen 15 to clear the same.

The other blade 52 of the sweep arm 27 is provided with a brush 59 made up of a plurality of tufts of nylon bristles set in spaced relation radially in a rib 60 formed integrally with the bottom wall of the hollow blade 52. These bristles extend downwardly to engage the bottom 53 of the cup shaped screen 15 to sweep the latter and to loosen up adhering particles and sludge for later removal by the jets of oil under pressure eminating from the apertures 56 in the other blade 51 of the sweep arm 27.

By the foregoing arrangement it will be appreciated that the cup shaped screen 15 is swept and cleared of any clogging to assure passage of an adequate supply of oil from the sump 12 to the intake conduit 14 of the oil pressure system 10. The suction of oil into the intake conduit 14 by the pump P is directed through a booster for the turbine 30 which is under the influence of the oil under pressure from the pressure relief conduit 21. This booster entails another turbine 61 arranged in the path of oil flowing from within the cup shaped screen 15 into the intake conduit 14. As best seen in FIG. 1 the receiving end 62 of the conduit 14 communicates with a chamber 63 provided in the interior of the cylindrical housing 33 between the upper and lower bearings 34 and 40 which support the tubular shaft 28. The web 41 in which the lower bearing 40 is supported has a plurality of ports or passages 64 formed therethrough to communicate the chamber 63 with the interior of cup shaped screen 15 to receive oil therefrom. The cylindrical housing 33 extends below the web 41 to provide a housing 33' for the screw turbine wheel 65 secured to the shaft 28. The fins 66 on this turbine wheel 65 are spiral shaped in a direction such that the flow of oil upwardly through the wheel 65 exerts a turning force against the latter supplemental to that afforded by the oil under pressure flowing into the upper turbine 30.

Figure 4:
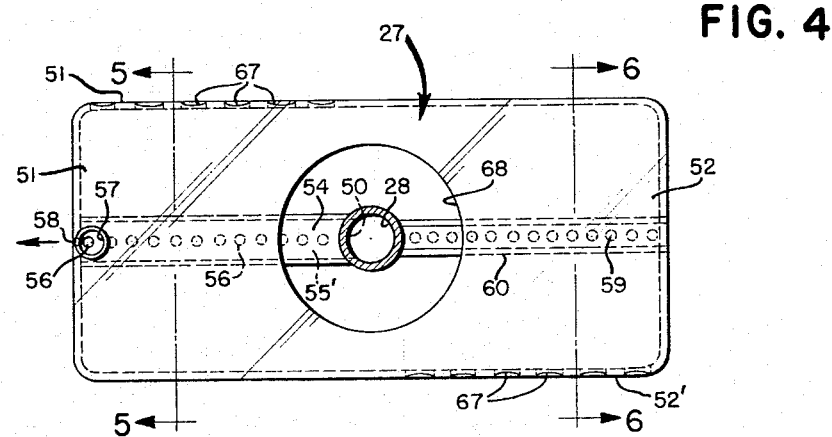
FIG. 4 is a horizontal section through FIG. 1 taken along line 4—4 in FIG. 1 to show a plan view of the sweep arm.
Figure 5:
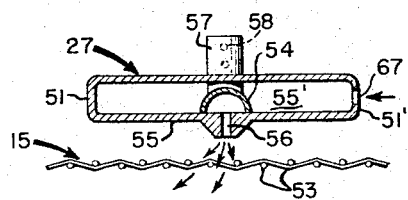
FIG. 5 is a section through FIG. 4 as seen from line 5—5 thereof.
Figure 6:
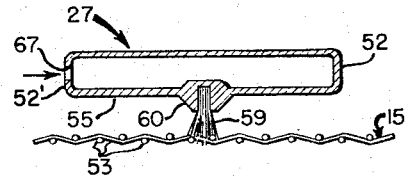
FIG. 6 is a section through FIG. 4 as seen from line 6—6 thereof.

The strained oil in the cup-shaped screen 15 which is relatively static is directed toward the open bottom of the screw turbine housing 33' via the hollow interiors of the two blades 51 and 52 of the sweep arm 27. Each blade of the sweep arm has a plurality of ports 67 on their leading edges 51'–52' to allow oil to enter the hollow centers of the blades. As best seen in FIG. 4 the upper surface of the sweep arm 27 has an opening 68 formed therein concentric to the shaft 28 and comparable to the open lower end of the screw turbine housing 33'. The oil standing in the cup-shaped screen 15 is scooped into the hollow centers of the blades 51 and 52 as they turn and such oil is directed out at and up through the opening 68. The suction of the oil into the intake conduit 14 from the chamber 63 lifts the oil discharging from the blades 51–52 up through the screw turbine 61 thereby impinging upon the spiral fins 66 of the turbine wheel 65 and turn the latter and shaft 28 in unison with the upper turbine 30.

Referring again to FIG. 7 in conjunction with FIG. 1 it will now be seen that when the pump P of the conventional oil pressure system is set into operation oil is immediately drawn by vacuum out of the cup shaped screen 15 via the intake conduit 14. Since the oil entering the conduit 14 is directed through the screw turbine 61 the shaft 28 immediately begins to turn (clockwise FIG. 4). By then the oil discharging from the pump P via conduit 16 has become pressurized sufficiently to bypass the engine and to return via the pressure relief line 18 and valve 20 to the discharge conduit 21. Such oil under pressure enters the upper turbine 30 as illustrated in FIG. 2 to transmit motion to the turbine wheel 39 and tubular shaft 28 and to escape under pressure down through the latter. The oil under pressure discharging via the tubular shaft 28 enters the isolation channel 55' and from thence is discharged as a series of jets out through the radially aligned and spaced apertures 56. These downwardly directed jets of oil under pressure reverse the normal flow of oil into the cup shaped screen 15 in a sweeping action following the actual sweeping of the radial brush 59 on the other blade 52 which is diametrically opposite the blade 51 in which the apertures 56 are formed. This keeps the screen from clogging up and from starving the intake conduit from receiving an adequate supply of oil. The side of the screen 15 is likewise flushed off from within by oil under pressure discharging from the ports 58 in the upstanding tube 57 at the end of the isolation channel 55'.

It should here be noted that the cover 25 for the cup shaped screen 15 is provided with an annular skirt 70 which circumscribes the side wall of the screen and in spaced relation thereto. A similar baffle 71 in the form of a disc is disposed in spaced relation to the bottom 53 of the screen 15. The baffle 71 is suspended from the bottom of the screen to keep heavier particles in the bottom of sump 12 the crank case pan 11 from being stirred and rising up toward the screen and perhaps fouling the same.

Having thus described my new anti-clogging device for the inlet screen in the sump of an oil pressure lubricating system it will be understood by those skilled in the art that the same may be susceptible to alterations, variations and/or modifications without departing from the spirit of my invention. I therefore desire to avail myself of all alterations, variations and/or modifications which fairly come within the purview of the appended claims.

What I claim as new and desire to protect by Letters Patent is:

1. In combination with the oil pressure system of an internal combustion engine having an oil inlet screen submerged in its crank case oil sump and confining the open end of an oil inlet conduit going to the oil pump of such oil pressure system for drawing oil under vacuum from said oil inlet screen, a turbine housing confined within said oil inlet screen having an open inlet end for receiving oil therefrom and a discharge end communicating with the open end of said oil inlet conduit, a turbine wheel in said turbine housing between its open inlet end and its discharge end, a shaft secured to said turbine wheel and extending into said oil inlet screen, a sweep arm secured to said shaft within said oil inlet screen for turning movement therein and having a pair of diametrically opposed hollow blades each having oil inlet apertures at their leading edges for scooping oil into said hollow blades, said hollow blades having an opening therein adjacent the open inlet end of said turbine housing for discharging the oil scooped into said blades into the open inlet end of said turbine housing and past said turbine wheel and toward the discharge end of said turbine housing and into said oil inlet conduit.

2. An anti clogging device for the oil inlet screen of the oil pressure system of an internal combustion engine in which an oil intake conduit has its inlet end confined within said screen for drawing oil from the crank case sump of such engine; said anti clogging device comprising a turbine mounted on said oil inlet screen and having a tubular shaft with a discharge end confined within said screen, a rotary arm mounted on the discharge end of said tubular shaft for turning therewith, an oil supply conduit communicating the pressure side of said oil pressure system with said turbine for turning the same, said rotary arm having a radially extending conduit thereon adjacent said screen and having its inner end communicating with the discharge end of said tubular shaft, said rotary arm having a plurality of discharge apertures spaced radially from said shaft adjacent said screen, said rotary arm having a hollow chamber therein and a plurality of ports formed through its leading edge for scooping oil into said hollow chamber, and the hollow chamber in said rotary arm having a discharge opening communicating with the inlet end of said oil intake conduit of said oil pressure system whereby oil scooped up into the chamber in said rotary arm is discharged into the inlet end of said oil intake conduit.

3. An anti clogging device for the oil inlet screen of the oil pressure system of an internal combustion engine in which an oil intake conduit has its inlet end confined within said screen for drawing oil from the crank case sump of such engine; said anti clogging device comprising a turbine mounted on said oil inlet screen and having a tubular shaft with a discharge end confined within said screen, a rotary arm mounted on said tubular shaft for turning therewith within said screen, an oil supply conduit communicating the pressure side of said oil pressure system with said turbine for turning the same, said rotary arm having a radially extending conduit thereon adjacent said screen and having its inner end communicating with the discharge end of said tubular shaft and having a plurality of discharge apertures facing said screen and spaced radially from said shaft, a cylindrical housing within said screen concentric to said tubular shaft and having a chamber communicating with the inlet end of said oil intake conduit, a screw turbine wheel on said tubular shaft within said chamber, said rotary arm having a hollow center formed therein and a plurality of ports formed through its leading edge for scooping oil into the hollow center of said rotary arm, and a discharge opening formed in said rotary arm communicating the hollow center of the latter with the chamber of said cylindrical housing whereby oil from the hollow center of said rotary arm discharges therefrom past said screw turbine wheel toward and into the inlet end of said oil intake conduit.

4. An anti clogging device for the oil inlet screen of the oil pressure system on an internal combustion engine in which an oil intake conduit has its inlet end confined within said screen for drawing oil from the crank case sump of such engine; said anti clogging device comprising a turbine mounted on said oil inlet screen and having a tubular shaft extending into the confines of said screen, a rotary arm mounted within said screen and on said tubular shaft for turning therewith, an oil supply conduit communicating the pressure side of said oil pressure system with said turbine for turning the same, a brush on said rotary arm for sweeping said screen, a radially extending conduit on said rotary arm having its inner end communicating with said tubular shaft and having a plurality of apertures spaced radially from said shaft and facing said screen, a housing within said screen having a chamber communicating the latter with the inlet end of said oil intake conduit, a screw turbine wheel in said chamber and secured to said tubular shaft between said screen and the inlet end of said oil intake conduit, said rotary arm having a hollow interior and a plurality of ports formed through its leading edge through which oil can enter into the interior of said rotary arm, and a discharge opening formed in said rotary arm communicating the hollow interior thereof with the chamber in said housing for discharging oil from the interior of said rotary arm into said chamber, past said screw turbine and into the inlet end of said oil intake conduit.

5. An anti clogging device for the oil inlet screen of the oil pressure system of an internal combusttion engine in which an oil intake conduit has its inlet end confined within said screen for drawing oil from the crank case sump of such engine; said anti clogging device comprising a turbine mounted on said oil inlet screen and having a tubular shaft with an open lower end disposed within said screen, a pair of rotary arms disposed within said screen and mounted on said tubular shaft for turning therewith, an oil supply conduit communicating the pressure side of said oil pressure system with said turbine for turning the same, a brush on one of said rotary arms having bristles engaging said screen for sweeping the latter, a radially extending conduit on the other one of said rotary arms communicating with the open lower end of said tubular shaft and having a plurality of apertures spaced radially from said shaft for discharging oil from said conduit toward said screen, a housing within said screen having a chamber concentric to said tubular shaft and communicating with the inlet end of said oil intake conduit, a screw turbine wheel on said tubular shaft within said chamber, said means on each of said rotary arms for directing oil from within said oil inlet screen toward the chamber of said housing for turning said screw turbine wheel and shaft conjointly with said first named turbine.

References Cited by the Examiner
UNITED STATES PATENTS

| 776,801 | 12/1904 | Rood | 210—355 |
| 1,169,725 | 1/1916 | Kilby | 210—334 |
| 1,703,335 | 2/1929 | Bower | 210—168 |
| 1,800,585 | 4/1931 | Woolson | 210—168 |
| 1,890,984 | 12/1932 | Gulick | 210—168 X |
| 2,100,482 | 11/1937 | Irwine | 210—354 |
| 2,440,384 | 4/1948 | Schenke | 210—355 X |
| 2,624,422 | 1/1953 | Molyneux | 184—6 |

REUBEN FRIEDMAN, *Primary Examiner.*

J. DE CESARE, *Assistant Examiner.*